United States Patent Office 3,118,877
Patented Jan. 21, 1964

3,118,877
SUBSTITUTED 6-UREIDOPENICILLANIC ACIDS AND SALTS THEREOF
Yvon G. Perron, Dewitt, and Lee C. Cheney, Fayetteville, N.Y., assignors, by mesne assignments, to Beecham Research Laboratories, Limited, Brentford, England, a corporation of Great Britain and Northern Ireland
No Drawing. Filed May 25, 1959, Ser. No. 815,282
7 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to novel N-substituted 6-ureidopenicillanic acids and nontoxic salts thereof.

This application is a continuation-in-part of our prior copending application S.N. 800,924, filed March 23, 1959, and now abandoned.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyrogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria.

There is provided, according to the present invention, a member selected from the group consisting of an acid having the formula

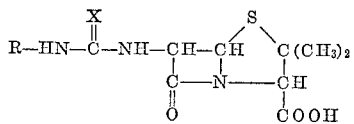

wherein X represents a member selected from the group consisting of oxygen and sulfur and R represents a member selected from the group consisting of alkyl (such as methyl, ethyl, n-propyl, isobutyl, n-hexyl, n-octyl or n-octadecyl), cycloalkyl (such as cyclopentyl, cyclohexyl or cycloheptyl), aryl (such as α-naphthyl, phenyl and substituted phenyl including chlorophenyl, bromophenyl, tolyl, xylyl, hydroxyphenyl, methoxyphenyl or dialkylaminophenyl) and aralkyl (such as benzhydryl, benzyl or phenethyl or such radicals bearing one or more chloro, bromo, methyl, hydroxy, alkoxy, or dialkylamino substituents); and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

Thus, a preferred agent provided by the present invention is a member selected from the group consisting of an acid having the formula

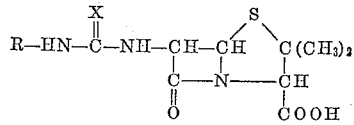

wherein X represents a member selected from the group consisting of oxygen and sulfur and R represents a member selected from the group consisting of alkyl containing less than twenty carbon atoms, cyclopentyl, cyclohexyl, cycloheptyl, phenyl, naphthyl, tolyl, xylyl, chlorophenyl, bromophenyl, hydroxyphenyl, (lower)alkoxyphenyl, (lower)dialkylaminophenyl benzhydryl, benzyl and phenethyl; and its sodium, potassium, calcium, aluminum and ammonium salts and nontoxic substituted ammonium salts with an amine selected from the group consisting of tertiary amines containing only the elements hydrogen and carbon in addition to the nitrogen atom, procaine, dibenzylamine, N-benzyl-beta-phenethylamine, 1-ephenamine, N,N'-dibenzylethylenediamine, dehydroabietylamine and N,N'-bis-dehydroabietylethylenediamine. Of these, a preferred series is that wherein X is oxygen and R is alkyl containing less than twenty carbon atoms.

The compounds of the present invention are prepared by the reaction of an organic isocyanate or isothiocyanate, i.e., a compound having the formula R—N=C=O or R—N=C=S where R represents alkyl, cycloalkyl, aryl or aralkyl as defined above, with 6-aminopenicillanic acid, preferably in the form of an easily hydrolyzed ester or of a salt of a tertiary amine, e.g., a tertiary aliphatic amine such as triethylamine. The conduct of the reaction is facilitated by the presence of an unreactive, anhydrous organic solvent, such as dimethylacetamide; it is convenient to use an excess of triethylamine as the solvent. An unreactive solvent is thus one which provides no active hydrogens. Low temperatures, e.g., about 0° C. and below 100° C., are preferred but not essential. Roughly equimolar quantities of the two reagents are used. The presence of water or other compounds which also react with isocyanates is of course to be avoided. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 g./ml.) in dry n-butanol. The potassium salt forms, precipitates, usually in crystalline form, and is collected by filtration or decantation.

6-Aminopenicillanic acid is prepared according to Batchelor et al. (Nature 183, 257, 258, January 24, 1959), or Belgian Patent 569,728.

Hydrocarbonyl alcohols and tertiary hydrocarbonyl amines are compounds having the formula

R—OH and

wherein the R groups contain only the elements carbon and hydrogen.

The following examples will serve to illustrate this invention without limiting it thereto.

*Example 1*

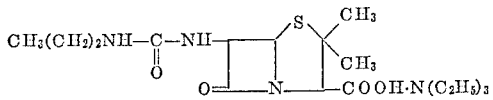

To a stirred and cooled suspension of 1.08 g. (0.005 mole) of 6-aminopenicillanic acid in 12 ml. of dimethylformamide, 12 ml. of triethylamine were slowly added. The resulting mixture was stirred and cooled while 0.5 g. of n-propyl isocyanate in 5 ml. of dimethylformamide was added dropwise. The resulting mixture was stirred in an ice-bath for one hour and allowed to stand overnight at room temperature. The almost clear solution was then filtered to remove traces of insoluble material. The filtrate, after diluting with dry ether, deposited 0.75 g. of white crystalline product, the triethylamine salt of D,α-6-propylureidopenicillanic acid, which decomposed between 165° C. and 175° C. This material is very soluble in cold water.

*Analysis.*—Calcd. for $C_{18}H_{34}N_4O_4S$: C, 53.73; H, 8.45. Found: C, 53.78; H, 8.40.

*Example 2*

Substitution for the n-propyl isocyanate in the procedure of Example 1 of an equimolar amount of n-hexyl isocyanate, n-octadecyl isocyanate, cyclohexyl isocyanate, para-chlorophenyl isocyanate, meta-methoxyphenyl isocyanate, benzyl isocyanate, n-propyl isothiocyanate, n-butyl isothiocyanate, cyclopentyl isothiocyanate, p-tolyl isothiocyanate and p-dimethylaminophenyl isothiocyanate, respectively, produces the acids D,α-6-n-hexylureidopenicillanic acid, D,α-6-n-octadecyl-ureidopenicillanic acid, D,α-6-cyclohexyl-ureidopenicillanic acid, D,α-6-para-chlorophenyl-ureidopenicillanic acid, D,α-6-meta-methoxyphenylureidopenicillanic acid, D,α-6-benzyl-ureidopenicillanic acid, D,α-6-n-propyl-thioureidopenicillanic acid, D,α-6-n-butyl-thioureidopenicillanic acid, D,α-6-cyclopentyl-thioureidopenicillanic acid, D,α-6-p-tolyl-thioureidopenicillanic acid, and D,α-6-p-dimethylaminophenyl-thioureidopenicillanic acid, respectively, in the form of their triethylamine salts. These compounds inhibit the growth of penicillin-resistant Gram-positive bacteria such as *Micrococcus pyogenes* var. *aureus* and are effective therapeutic agents in animals against infections caused by such organisms.

*Example 3*

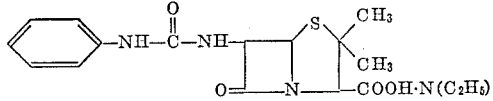

To a stirred and cooled suspension of 1.08 g. (0.005 mole) of 6-aminopenicillanic acid in 15 ml. of dimethylformamide was added 15 ml. of triethylamine. Phenyl isocyanate (0.7 g.) in 5 ml. of dimethyl formamide was then added dropwise to the cooled and stirred reaction mixture. When the addition had been completed the stirring was continued for one hour at room temperature and then the almost clear solution was allowed to stand for two hours at room temperature. After filtration, the clear filtrate was diluted with dry ether. The crystalline product, the triethylamine salt of D,α-6-phenylureidopenicillanic acid, which separated was collected by filtration, washed with dry ether, dried in vacuo at room temperature and found to weigh 0.69 g., M.P. 180–182° C. (dec.).

*Analysis.*—Calcd. for $C_{21}H_{32}N_4O_4S$: C, 57.79; H, 7.34. Found: C, 57.2; H, 7.79.

*Example 4*

To a cooled and stirred suspension of 1.08 g. (0.005 mole) of 6-aminopenicillanic acid in 5 ml. dimethylformamide there was slowly added 5 ml. triethylamine. While the resulting suspension was stirred and cooled, a solution of 0.8 g. (0.0052 mole) o-chlorophenyl isocyanate in 5 ml. dimethylformamide was slowly added and the reaction was stirred in the ice-bath for 15 minutes and then at room temperature for 150 minutes. After filtering over filter-aid and washing the cake with 2 ml. dimethylformamide, the clear filtrate was carefully diluted with ether until the solution became cloudy. After scratching the interior wall of the flask crystallization soon began. The colorless crystalline product, triethylammonium 6-(2-chlorophenylureido)-penicillanate was collected by filtration, washed with 3 ml. ether, dried and found to weigh 1.53 g., to melt at 173–175° C. (dec.), to be very soluble in cold water, to contain a β-lactam group by infrared analysis and to inhibit *Staph. aureus* Smith.

*Analysis.*—Calcd. for $C_{21}H_{31}ClN_4O_4S$: C, 53.56; H, 6.58. Found: C, 53.41; H, 6.85.

*Example 5*

The procedure of Example 4 was followed, replacing the o-chlorophenyl isocyanate with an equivalent amount of o-tolyl isocyanate (0.672 g.), n-butyl isocyanate (0.50 g.), ethyl isocyanate (0.35 g.), phenyl isothiocyanate and n-butyl isothiocyanate (0.58 g.), respectively, to produce (a) Triethylammonium 6-(2-methylphenylureido)-penicillanate, 0.5 g., M.P. 148–150° C. (d.), which was very soluble in water and inhibited the growth of *Staph. aureus* Smith at a concentration of 0.62 mcg./ml.

*Analysis.*—Calcd. for $C_{16}H_{19}N_3O_4S \cdot (CH_3CH_2)_3N$: C, 58.65; H, 7.61. Found (corrected for water of hydration): C, 58.02; H, 7.41.

(b) Triethylammonium 6-(n-butylureido)-penicillanate, 1.54 g., M.P. 162–165° C. (d.), which was very soluble in water, contained the β-lactam group by infrared analysis and inhibited the growth of *Staph. aureus* Smith at a concentration of 0.62 mcg./ml.

*Analysis.*—Calcd. for $C_{19}H_{36}N_4O_4S$: C, 54.7; H, 8.71. Found: C, 54.62; H, 8.58.

(c) Triethylammonium 6-ethylureidopenicillanate, 1.17 g., M.P. 166–168° C. (d.), which was very soluble in water, contained the β-lactam group by infrared analysis and inhibited the growth of *Staph. aureus* Smith at a concentration of 1.25 mcg./ml.

*Analysis.*—Calcd. for $C_{17}H_{32}N_4O_4S$: C, 52.5; H, 8.30. Found: C, 52.5; H, 8.42.

(d) Triethylammonium 6-phenylthioureidopenicillanate, 1.06 g., M.P. 105–115° C., which was very soluble in water and contained the β-lactam group by infrared analysis.

*Analysis.*—Calcd. for $C_{21}H_{32}N_4O_3S_2$: C, 55.7; H, 7.13. Found: C, 53.6; H, 7.01; and (e) Triethylammonium n-butylisothioureidopenicillanate, 1.33 g., M.P. 136–137° C. (d.), which was very soluble in water and was shown to contain the β-lactam group by infrared analysis.

*Analysis.*—Calcd. for $C_{13}H_{21}N_3O_3S_2 \cdot (C_2H_5)_3N$: C, 52.8; H, 8.39. Found: C, 52.79; H, 8.48.

*Example 6*

To a cooled, stirred suspension of 3.24 g. (0.015 mole) of 6-aminopenicillanic acid in 15 ml. dimethylformamide was added 10 ml. triethylamine followed by a solution of 1.49 g. (0.015 mole) allyl isothiocyanate. The mixture was stirred in ice for fifteen minutes and then at room temperature for six hours. The crystalline product, triethylammonium 6-allylthiouredopenicillanate, which precipitated was collected by filtration, washed in turn with dimethylformamide and ether, dried in vacuo over $P_2O_5$ and found to weigh 4.52 g., to melt at 140–141° C. (d.), to be very soluble in water and to contain the β-lactam ring as shown by infrared analysis.

*Analysis.*—Calcd. for $C_{18}H_{32}N_4O_3S_2$: C, 52.0; H, 7.75. Found: C, 52.55; H, 8.21.

*Example 7*

Replacing the allyl isothiocyanate in the procedure of

Example 6 with methyl isothiocyanate (2.19 g., 0.015 mole) gave crystalline triethylammonium 6-methylthio-ureidopenicillanate, M.P. 119–121° C. (d.) which was very soluble in water, was shown to contain the β-lactam group by infrared analysis and exhibited upon i.m. injection in mice a $CD_{50}$ versus *Staph. aureus* Smith of 4.5 mgm./kg.

*Analysis.*—Calcd. for $C_{16}H_{30}N_4O_3S_2$: C, 49.23; H, 7.69. Found: C, 49.41; H, 7.65.

Example 8

The procedure of Example 4 was followed, replacing the 0.0052 mole o-chlorophenyl isocyanate with the number of moles of isocyanate given below and altering the reagents and solvents in proportion as follows:

(*a*) p-Methoxyphenyl isocyanate (7.5 g., 0.05 mole) to produce triethylammonium 6-(4-methoxyphenylureido)penicillanate as a tan solid after trituration in ether n-pentane and methyl isobutyl ketone, 10 g., M.P. 213–216° C. (dec.) which was very soluble in water, contained the β-lactam group as shown by infrared analysis and inhibited the growth of *Staph. aureus* Smith.

(*b*) o-Nitrophenyl isocyanate (4.92 g., 0.03 mole) to produce a solution of triethylammonium 6-(2-nitrophenylureido)penicillanate in dimethylformamide to which was added dry ether and 18 ml. of a solution of 40% potassium 2-ethylhexanoate in n-butanol to precipitate potassium 6-(2-nitrophenylureido)penicillinate as an orange, crystalline salt, 5 g., M.P. 219–223° C. (dec.), which contained the β-lactam group as shown by infrared analysis and inhibited the growth of *Staph. aureus* Smith.

(*c*) o-Methoxyphenyl isocyanate (8.94 g., 0.06 mole) to produce crystalline triethylammonium 6-(2-methoxyphenylureido)-penicillanate, 20.12 g., M.P. 173–175° C., which inhibited the growth of *Staph. aureus* Smith.

(*d*) m-Methylphenyl isocyanate (0.0505 mole) to produce triethylammonium 6-(3-methylphenylureido) penicillanate as an oil which was dissolved in 25 ml. n-butanol. Addition of 23 ml. of a 40% solution of potassium 2-ethyl-hexanoate in butanol followed by ether precipitated solid potassium 6-(3-methylphenylureido)penicillanate, 18.1 g., M.P. 195° C. (d.), which inhibited the growth of *Staph. aureus* Smith.

(*e*) p-Nitrophenyl isocyanate (0.05 mole) following "*d*" above produced solid potassium 6-(4-nitrophenylureido)penicillanate, 14.5 g., which decomposes slowly upon heating above 200° C. and inhibited the growth of *Staph. aureus* Smith.

(*f*) m-Chlorophenyl isocyanate (0.05 mole) following "*d*" above produced solid, water-soluble potassium 6-(3-chlorophenylureido)penicillanate, 6.2 g., which decomposed upon heating above 200° C. and inhibited the growth of *Staph. aureus* Smith.

We claim:
1. An acid having the formula

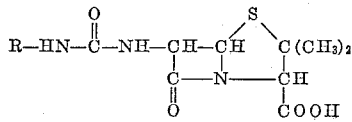

wherein R represents alkyl containing less than twenty carbon atoms.

2. An acid having the formula

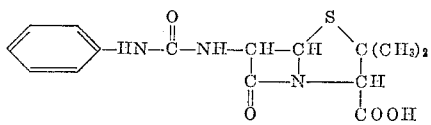

3. An acid having the formula

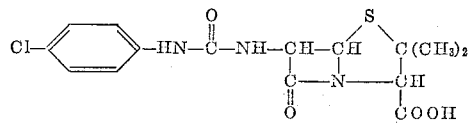

4. An acid having the formula

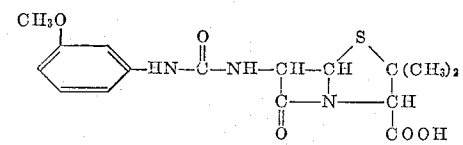

5. An acid having the formula

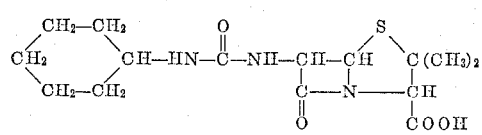

6. An acid having the formula

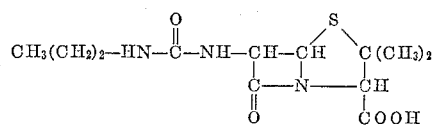

7. A member selected from the group consisting of an acid having the formula

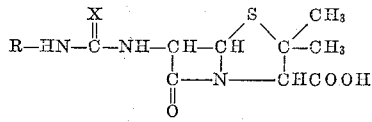

wherein X represents a member selected from the group consisting of oxygen and sulfur and R represents a member selected from the group consisting of alkyl containing less than twenty carbon atoms, cyclopentyl, cycloheptyl, allyl, naphthyl, phenyl, chlorophenyl, bromophenyl, tolyl, xylyl, hydroxyphenyl, (lower)alkoxyphenyl, (lower)dialkylaminophenyl, nitrophenyl, benzyl and phenethyl; and their nontoxic, pharmaceutically acceptable salts.

References Cited in the file of this patent

Fieser et al.: Organic Chemistry, page 647 (second edition), 1950.